United States Patent

[11] 3,601,957

[72] Inventor Richard A. Duncan
Lafourche Parish, La.
[21] Appl. No. 722,286
[22] Filed Apr. 18, 1968
[45] Patented Aug. 31, 1971
[73] Assignee Thomson Machinery Company, Inc.
Thibodaux, La.

[54] SUGAR CANE COMBINE
10 Claims, 6 Drawing Figs.

[52] U.S. Cl. ................................................ 56/13.8,
56/14.3
[51] Int. Cl. .......................................... A01d 45/10
[50] Field of Search ........................................ 56/15, 17,
53, 66, 94, 98, 119, 504, 317, 345

[56] References Cited
UNITED STATES PATENTS
2,561,754  7/1951  Propheter ..................... 56/345
1,710,611  4/1929  Duncan ........................ 56/17
2,352,257  6/1944  Dray ............................ 56/119
2,532,904  12/1950 Guild ........................... 56/15
2,724,228  11/1955 Duncan ........................ 56/17
3,350,865  11/1967 Ashton et al. ................ 56/94
3,419,896  12/1968 Duncan ........................ 146/133
3,434,270  3/1969  Gaunt et al. .................. 56/98
3,438,184  4/1969  Jellis ........................... 56/119

Primary Examiner—Antonio F. Guida
Attorney—Ralph R. Browning

ABSTRACT: A three-wheel, self-propelled sugarcane combine having a rotary cutter mounted on the front of the frame for cutting off the tops of the stalks, and a harvesting frame containing a rotary ground knife for severing the stalks from the roots, revolving, reciprocating sickle bars for preliminarily processing the cane by cutting it into short segments, pickup and feeding means for picking erect as well as down cane and feeding it perpendicularly to the sickle bars and then transporting it perpendicularly to a hopper. A conveyor transports the cut cane from the hopper to a transport wagon. A hugger chain atop of the elevating section of the conveyor prevents tumble-back.

RICHARD A. DUNCAN
INVENTOR

RICHARD A. DUNCAN
INVENTOR.

BY Browning, Heyer, Eickenroht & Thompson
ATTORNEYS

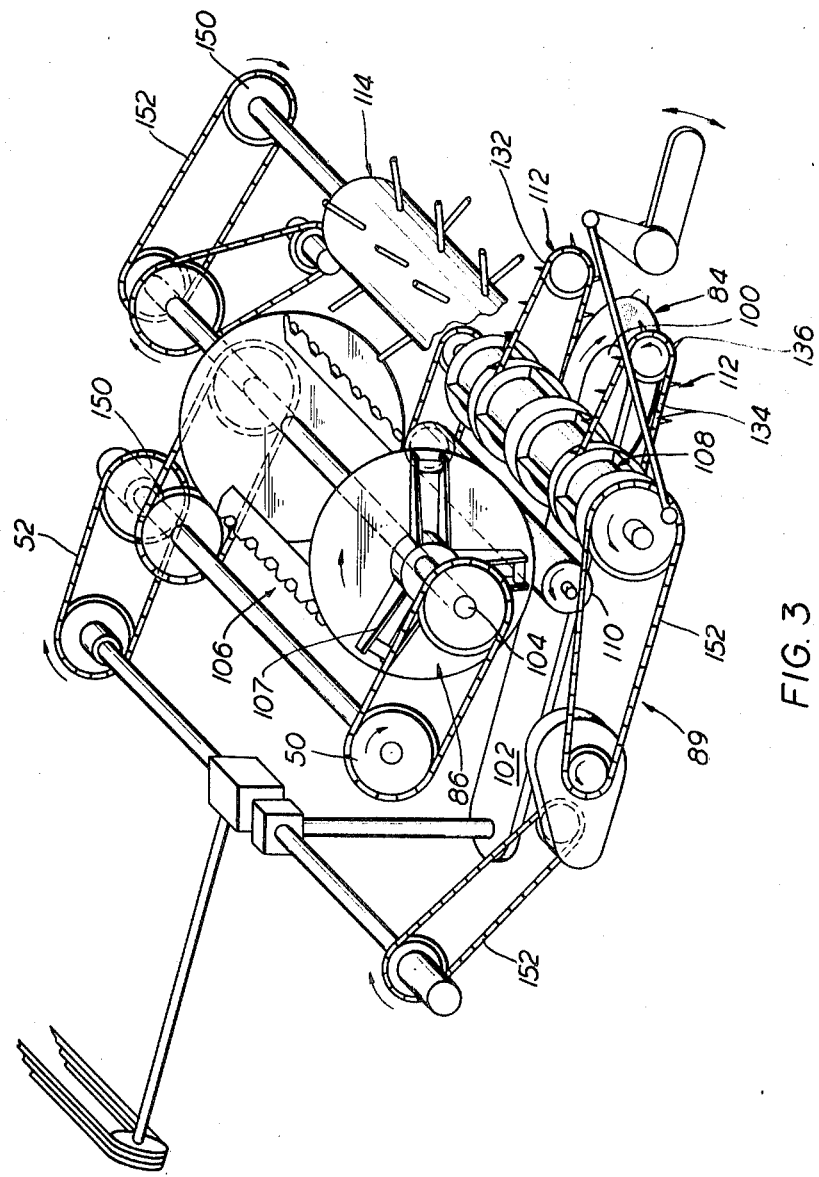

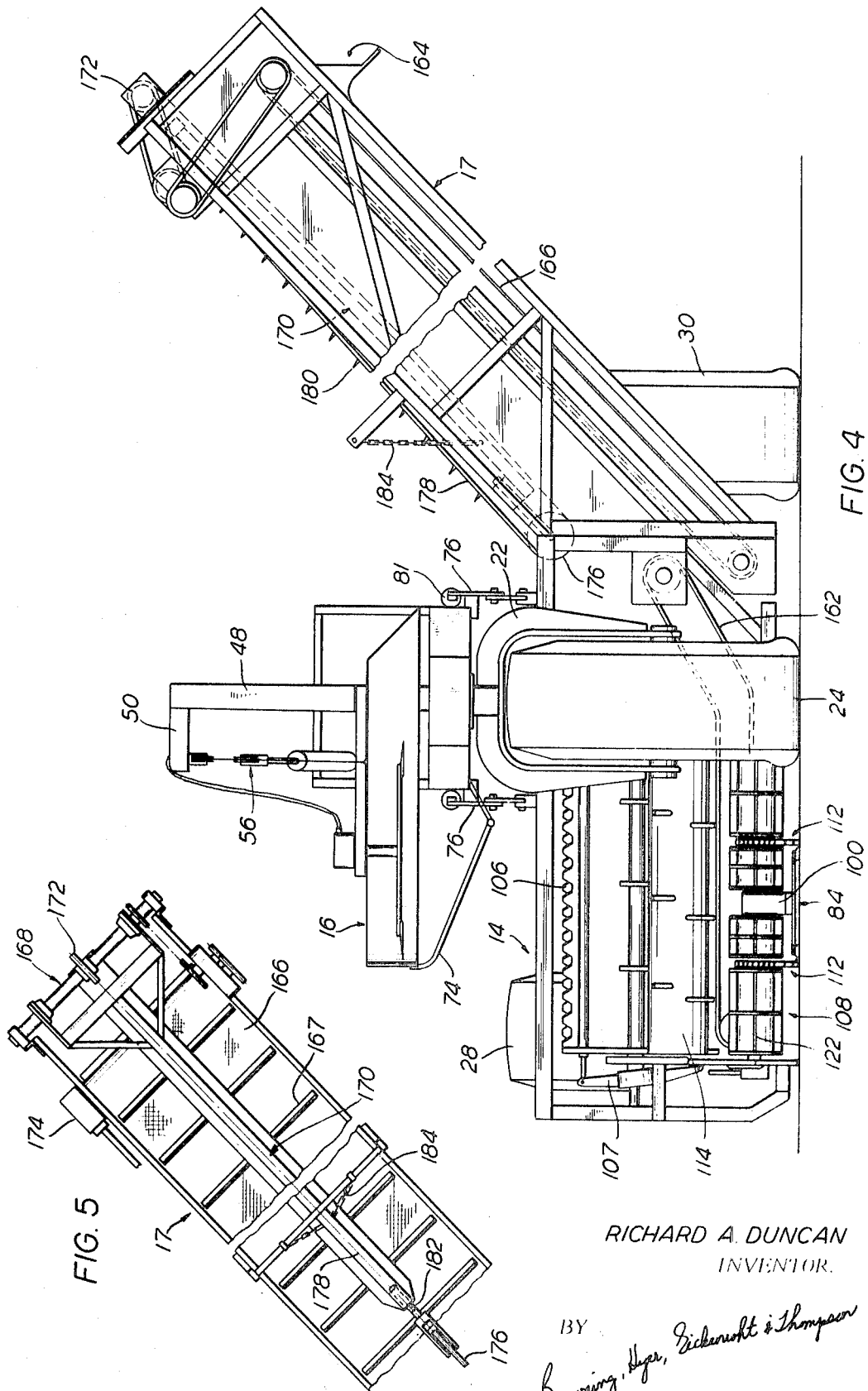

3,601,957

SUGAR CANE COMBINE

BACKGROUND OF THE INVENTION

This invention relates to apparatus primarily useful for harvesting sugarcane and more particularly relates to improvements over the Sugarcane Harvester disclosed in applicant's copending application Ser. No. 422,116, filed Dec. 30, 1964 now U.S. Pat. No. 3,419,896.

Applicant's aforesaid application discloses a self-propelled sugarcane harvester, having a rotating ground knife for severing the cane stalks from the roots; conveyors for picking up the severed stalks and transporting them to a transversely mounted rotating cutter having a plurality of reciprocating sickle bars which cut the severed stalks into short lengths, a hopper for receiving the short lengths and a conveyor for loading the preliminarily processed cane from the hopper into a field wagon.

Sugar cane and similar crops often lie in a tangled and recumbent condition on the ground as well as standing in various degrees of erectness. Therefore, it is most desirable that the harvester be able to pick up erect cane as effectively as down cane. After the cane is picked up, it is desirable that it be fed to the sickle bar cutter so that the stalks are more or less normal to the cutting action of the sickle bars. It is also necessary to deliver the preliminarily processed cane to a hopper. Accordingly, one of the objects of the present invention is to provide an improved novel pickup and feeding means for a sugarcane combine which will pick up erect cane as effectively as down cane.

It is another object to provide a novel pickup and feed mechanism for erect as well as down cane, which feeds the cane in a direction generally perpendicular to the axis of reciprocation of the sickle bar cutter and transports the preliminarily processed cane to a hopper.

The tops of sugar cane stalks are of no value and, therefore, it is desirable that they be cut from the stalk prior to preliminary processing so that the field-processed cane will be free of debris. Accordingly, it is a further object of the invention to provide a sugarcane combine having a cutter for removing the tops from sugarcane stalk.

After the cane has been preliminarily processed and delivered to the hopper it is transported via an endless chain-slot-belt conveyor or a two-piece chain-slot-belt and/or drag-slat conveyor. The conveyor for such cane is customarily positioned at a substantially steep angle. It is desirable that means be provided to prevent the cane from tumbling backward off the steeply inclined portion of the conveyor. Accordingly, it is a further object to provide an improved means to prevent cane from tumbling off the conveyor.

It is a further object to provide an improved sugarcane combine having means to top the cane, sever the cane from the root, pick up and feed the severed cane, whether erect or recumbent, to a cutter where it is preliminarily processed by cutting it into small segments and then delivering such preliminarily processed cane to a transport wagon.

In order to accomplish the above objects, as well as other objects which will be apparent to those skilled in the art, the sugar cane combine of the present invention is formed of a three-wheel, self-propelled vehicle having a rotary top cutter for cutting the tops from the cane stalks and a harvester frame which can be raised and lowered. The harvester frame has a rotating ground knife for severing the cane, cutter means located rearward of the ground knife for preliminarily processing the cane by cutting it into short lengths, pickup and feeding means for conveying erect and down cane to the cutter means, a hopper for receiving the preliminarily processed cane and a conveyor for transporting it to a transport wagon. The pickup and feeding means is formed of a segmented pickup drum located above the ground knife, a backup and transport drum positioned underneath the rotating cutter, a feeder drum located forward and above the pickup drum, and a pair of conveyor chains, one spaced on either side of the ground knife and extending forward thereof. These elements cooperate to pick up erect as well as down cane, feed it in an expeditious manner to the rotating cutter where it is preliminarily processed and transport the cut cane to the hopper. The conveyor which is at a steep angle is provided with a hugger chain which prevents the conveyed cane from tumbling backwards.

BRIEF DESCRIPTION OF THE DRAWINGS

FIG. 3 is an isometric projection illustrating the principle drive connections of the harvester;

FIG. 4 is a front view of the combine;

FIG. 5 is a fragmentary plan view of the conveyor showing the construction of the hugger chain which prevents tumbling back of the conveyed cane;

DESCRIPTION OF THE PREFERRED EMBODIMENT

Figure 1:
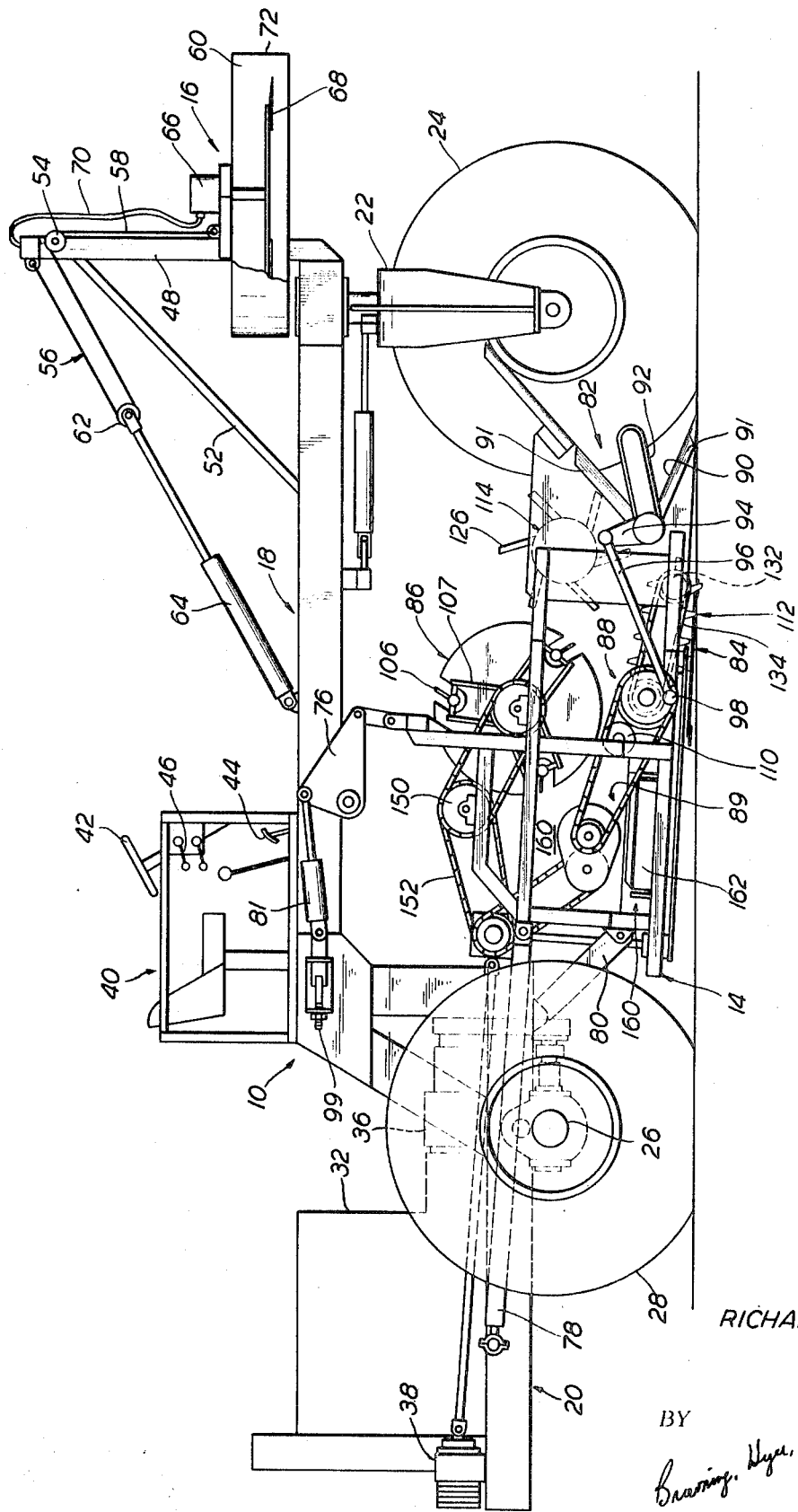
FIG. 1 is a side elevation of a sugarcane combine constructed in accordance with the invention, certain portions being omitted for clarity and other portions being schematically illustrated.

Referring now to the drawings, it can be seen that the sugarcane combine is formed of a three-wheel, self-propelled vehicle 10 having a main frame 12 to which is attached a harvesting frame 14 containing various harvesting instrumentalities, a rotary top cutter 16 and a conveyor 17.

Frame 12 of vehicle 10 has a forward, elevated portion 18 and a rearward depressed portion 20. Attached to the forward end of portion 18 is a steerable yoke 22 in which is journaled front wheel 24. Attached to an axle 26 located in portion 20 are rear wheels 28 and 30. The wheels may be so arranged that the front wheel will run in one furrow and the rear wheels in other furrows.

An internal combustion engine 32 is mounted on portion 20 of frame 12. A drive shaft extends from the engine to a customary transmission 36 connected to axle 26 for driving rear wheels 28 and 30. Power takeoff 38 for providing power for some of the harvesting instrumentalities also extends from engine 32.

An operator's station 40 is located on portion 18 of frame 12. Located at the operator's station are steering controls 42, engine controls 44 and harvesting controls 46.

Rotary top cutter 16 is suspended from the forward end of portion 18 of frame 12 to sever the unuseable tops from the sugarcane stalks. To suspend top cutter 16, a member 48 extends upward from the front of frame 12. Attached to the top of vertical member 48 is a laterally extending member 50. Angularly extending bracing members 52—52 attached to portion 18 may also be provided. A pulley 54 of a chain hoist 56 is attached to the end of laterally extending member 50. A chain 58 of chain hoist 56 extends around pulley 54 and is fixedly attached to a frame 60 carrying top cutter 16. The other pulley 62 of chain hoist 56 is connected to reciprocating power cylinder 64. By extending or retracting power cylinder 64, top cutter 16 is raised or lowered. Atop of frame 60 is a hydraulic motor 66 for rotating a cutter blade 68. Flexible hose members 70—70 run to the hydraulic motor 66 to supply hydraulic fluid to motor 66. Frame 60 is provided with a guard 72 to prevent the rearward movement of severed tops. Lateral stabilizing member 74 extends from cutter frame 60 to frame 12 to prevent lateral swinging of top cutter 16. Controls for power cylinder 64 for vertically positioning top cutter 16, as well as controls for hydraulic motor 66, are located at operators station 40. Top cutter 16 may be adjusted vertically to sever the unuseable tops from the stalks whereby the cane delivered by the combine to the transport wagon will be free from debris.

As previously mentioned, harvesting frame 14 is suspended from main frame 12. This may be accomplished by appropriate linkage such as pivot links 76—76, one being attached to each side of portion 18 of frame 12, pivotable struts 78—78 one being attached to each side of portion 20 of frame 12, and by thrust link 80. The pivot points are positioned so that inclination of the harvester frame at any elevation is at an optimum angle for such elevation. Hydraulic power cylinders 81 are attached to the various pivot links to raise and lower frame 14. Hydraulic power is provided to the power cylinders and controls for positioning the harvesting frame are located at the operator's station.

Harvesting frame 14 is formed to two generally rectangular structural side portions which are tied together by cross members. Mounted in the frame are the various harvesting instrumentalities including side trimming knife assembly 82, rotary ground knife 84, rotating sickle bar cutter 86 and pickup and feed mechanism 88, all of which are driven from power takeoff 38 on engine 32 through chain drive 89.

Located at the forward end of the right side portion is side trimming knife assembly 82. The forward end of the side portion has a notch 90 forming stationary cutter bars 91—91. A pivoted knife blade 92 is arcuately moved past the cutter bars to sever off the ends of any recumbent stalks. Knife 92 is connected to a bell crank 94 which, in turn, is connected to a clevis 96 attached to a rotating power shaft 98. As shaft 98 rotates it moves knife 92 through an arc which passes the edges of the stationary cutter bars; therefore, if there are any stalks in the open space between the cutter bars they are severed by the knife.

Ground knife 84 is mounted for rotary movement on the forward portion of harvesting frame 14. The ground knife may be formed of a circular disk having a plurality of cutting blades fixed to its periphery. The disk is attached to a hub 100 which is rotated by a belt 102 which is connected to power takeoff 38 through appropriate connections. The ground knife 84 severs the stalks from the cane root. The height of ground knife 84 may be regulated by positioning of adjusting screws 99—99 which are located to the rear of the power cylinder 81 attached to pivot links 76.

The severed stalks are transported by pickup and feed mechanism 88 to sickle bar cutter 86 which is mounted on transverse axle 104 and is rotatively driven by chain drive 89. The sickle bar cutter is provided with a plurality of pairs of reciprocating sickle bars 106 which preliminarily process the cane by cutting the stalks into short segments. The construction and operation of cutter 86 and sickle bars 106 is more fully disclosed in my aforesaid copending application. As can be seen, the sickle bars 106 extend parallel with the axis of axle 104. Attached to the longitudinal ends of the sickle bars are swash mechanisms 107 which are arranged so that they operate in unison and with opposite angularity so that in operation the sickle bars are appropriately reciprocated in opposite directions.

In order to deliver the severed cane, whether erect or recumbent, to sickle bar cutter 86, there is provided novel pickup and feeding means 88 formed of a segmented pickup drum 108, a smooth backing roller 110, a pair of endless chain conveyors 112—112 and feeder drum 114. The pickup and feeding means delivers the severed cane to the rotating sickle bars in a generally perpendicular flow.

In order to pick up and feed erect cane or recumbent cane lying in line with the furrow, the combine is provided with a segmented pickup drum 108 mounted for rotation on transversely extending axle 116. The pickup drum is made up of four sections, there being a section between the hub and each chain conveyor, and a section outboard of each chain conveyor. Each section of pickup drum 108 is provided with a plurality of radially extending members 118 and circumferentially extending members 120 which, together, form radially outwardly open pockets 122. The pickup drum is so designed that it picks up any cane whether erect or recumbent lying in line with the direction of movement of the harvester.

The pockets 122 contact the ends of the cane and move the cane ends into the harvester. The pockets prevent the cane from moving crossway; therefore, the cane is delivered to the sickle bars in proper orientation.

Mounted rearward of pickup drum 108 and underneath bar cutter 86 is rotating smooth backing roller 110 which serves to "back up" the sugar cane stalks against the cutting thrust of the revolving and reciprocating sickle bars. It is desirable that the cane flow between the sickle bars and the backing roller be generally perpendicular to the axis of the rotating sickle bar cutter.

Positioned above and forward of the pickup drum 108 is transversely extending axis 124 on which is mounted feeder drum 114 provided with a plurality of chordally extending arms 126 which may be arranged to form converging helical paths. The arms are reversely bevelled at their outer ends. The feeder drum contacts the cane from the top; therefore, when the stalks are severed from their roots by the ground knife, the butt ends of the stalks tend to move toward the pickup drum. The radially outwardly open pockets of the pickup drum engage the butt ends and transport the stalks toward the sickle bar cutter. Since the arms are arranged in converging helical patterns, they also tend to move the cut cane laterally of the harvester to effect a good distribution of the cane along the transverse extend of the drum. The arms can also be arranged to converge to the center to orientate erect stalks in a direction of travel position for shortest cut lengths.

As mentioned, transversely extending axle 116 is directly above hub 100. Mounted on axle 116 are two rotating sprocket wheels 128, one on each side of rotating ground knife 84. Extending forward of the axle are brackets 130, each of which contain forward idle sprocket wheel 132. Trained over sprocket wheels 128 and 132 is an endless chain 134 having a plurality of fingers 136. The endless chain conveyors or transverse pickup tines are continuously in motion and pick up recumbent cane, particularly that which is crossway to the furrow, ridge, or flat surface.

Figure 2:
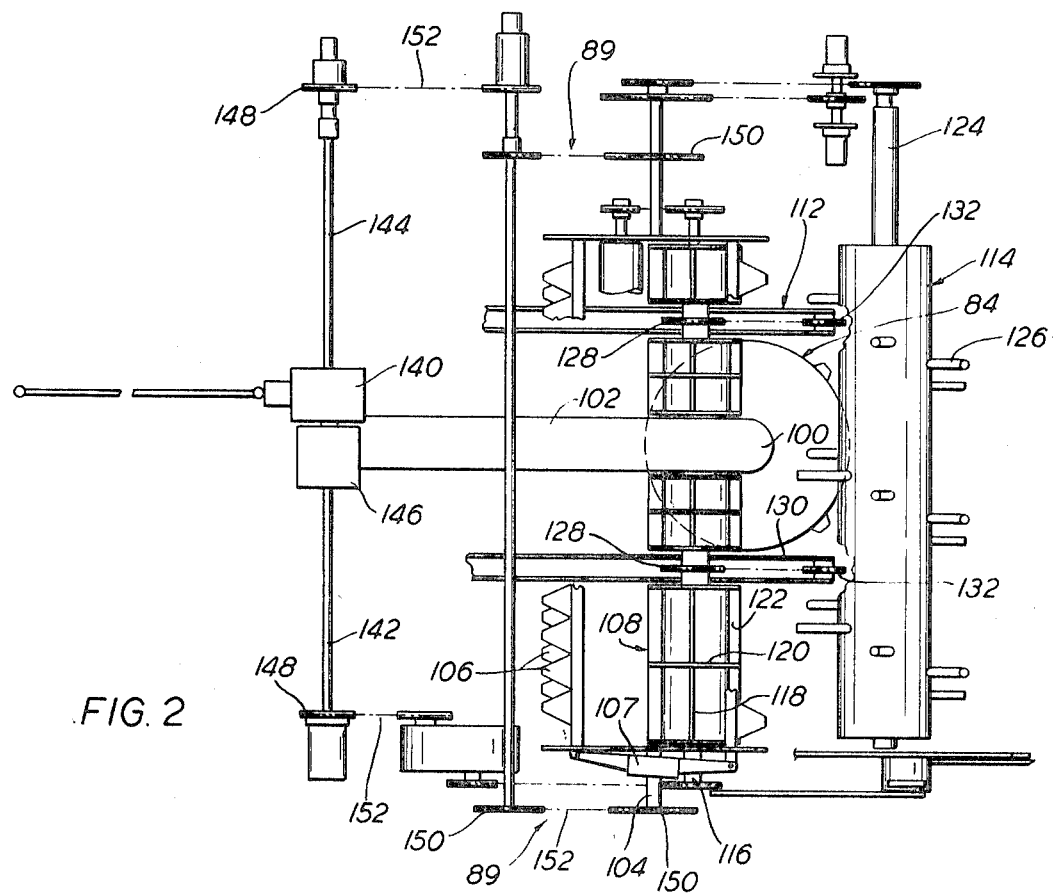
FIG. 2 is a top plan view of the various harvesting instrumentalities disclosed in FIG. 1.

The various harvesting instrumentalities are driven by chain drive 89 which derives its power from power takeoff 38 of engine 32. As can be seen in FIGS. 2, 3 and 4, a rotating shaft 138 extending from power takeoff 38 is connected to a universal gear drive 140 from which extends two shafts 142-144, one to one side and the other to the other side of harvesting frame 12. Shaft 142 may extend through a speed reducer 146. Attached to the ends of the shafts are sprockets 148. Attached to the ends of the axles for the various instrumentalities such as rotating sickle bar cutter 86, pickup drum 108, feeder drum 114 and roller 110, are sprockets 150. Endless chains 152 are entrained over sprockets 148 and 150 to form chain drive 89 for the various instrumentalities. The sprockets have varying diameters and numbers of teeth to provide the proper speed. Also, gear reduction mechanism may be incorporated in the drive.

The pickup fingers 136 of chain conveyors 112 travel forwardly very close to the ground and pick up any cane that is lying crosswise to the furrow. On the upper run of the chain conveyor, pickup fingers 136 travel rearwardly and, therefore, carry the cane into the harvester. The arms of feeder drum 114 tend to move any crosswise cane into a more properly oriented position so that the feed of the cane to the sickle bar cutter will be in a direction generally perpendicular to the axis of reciprocation. As mentioned, the pickup drum will contact the ends of any cut cane aligned with the row and pick it up and move it toward the rotating sickle bar cutter, while the chain conveyors take care of any crosswise cane. The pockets of the pickup drum and the pickup fingers prevent the cane from moving crosswise. It has been found that with such pickup and feeding means it is not necessary to handpick the field.

Figure 6:
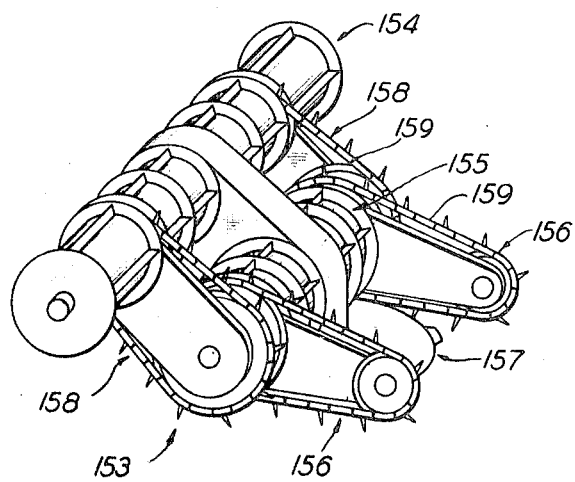
FIG. 6 is a perspective view illustrating the construction of a ground knife utilized for furrowed cane.

In the event the combine is to be used in an irrigated field having deep furrows, the combine may have a forwardly extending ground knife assembly 153 which extends into the furrow. Such construction is shown in FIG. 6 where it can be seen that the ground knife assembly 153 extends forward and downward from a pickup and feed drum 154 which is similar to pickup drum 108. The ground knife assembly is provided with a second pickup and feed pocketed drum 155. Chain conveyors 156 for picking up recumbent cane which is transverse to the furrow extend forward of and on each side of rotating ground knife 157. Chain drives 158 extending from the pickup drum 154 to the ground knife assembly drive the second pickup drum 155 and pickup chain conveyor 156. Chain drive 158 and chain conveyor 156 may be provided with pickup fingers 159.

After the stalks have been preliminarily processed by the sickle bar cutter, the cut segments are deposited by backing drum 110 into a hopper 160 which may be the top run of an endless transverse belt 162 for transporting the preliminary processed cane to conveyor 17 for movement into a transport wagon which may be positioned directly underneath an opening 164 in conveyor 17. It is often common for conveyor 17 to be at a very steep angle, see FIG. 4. The conveyor is provided with an endless belt 166 which receives the cane from transverse belt 162. Belt 166 may be open mesh and provided with crossbars 167. In order to prevent tumble-back of the material on endless belt 166, the conveyor is provided with a hugger chain assembly 168. As can be seen in FIGS. 4 and 5, the hugger chain assembly is formed of a T-bar 170, the arms of which are pivoted at the upper end of conveyor 17. Journaled on the arm end of bar 170 is a sprocket 172 which is driven by a motor 174 which also drives belt 166, see FIG. 5. At the other end of bar 170 is an idler sprocket 176. Trained over sprockets 172 and 176 is hugger chain 178 having fingers 180. The distance between the sprockets may be regulated by adjusting screw 182. The lower run of hugger chain 178 travels in the same direction as endless belt 166 and fingers 180 assist in the movement of the cane on endless belt 166. In the event that a large amount of cane is deposited on belt 166, bar 170 can swing upward to accommodate it. To prevent the bar from directly resting on belt 166, a chain 184 is attached to the bar 170 to regulate the lowest height of it above belt 166. The cane as it reaches the top of belt 166 is dumped through opening 164 into the transport wagon.

As can be seen from the foregoing, the improved sugarcane combine tops the stalks to eliminate debris, severs the stalks from the roots, expeditiously feeds the severed stalks to sickle bar cutters which cut the severed stalks into short segments and then transports the cut segments up a conveyor which deposits them in a transport wagon. With such a combine, clean short stalks are provided and hand pickup of the field is eliminated. From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a sugarcane combine formed of a harvester frame having a rotating ground knife for severing the cane stalks from the roots, a transversely mounted, rotating sickle bar cutter positioned rearwardly of the ground knife for cutting the severed stalks into short lengths and a hopper for receiving the cut up stalks, an improved pickup and feeding means comprising: a transversely mounted, rotating pickup drum having a plurality of radially outwardly open pockets, said pickup drum being positioned above said ground knife and forward of said sickle bar cutter, a pair of revolving, endless chain conveyors, one positioned on each side of said ground knife and extending forward from said pickup drum, said chain conveyors having a plurality of fingers extending outward from the chain to pickup cane lying transverse to the movement of the combine, a transversely mounted, rotating feeder drum having chordally extending arms positioned above and to the front of said pickup drum, and a transversely mounted, rotating backing and transfer drum positioned rearward of said pickup drum and beneath said sickle bar cutter, the pickup drum picking erect and down cane and feeding it to the backing and transfer drum where it is cut by the sickle bar cutter, said backing and transfer drum then transferring the cut up stalks to the hopper.

2. The sugarcane combine specified in claim 1 in which the rotating ground knife extends forward of the pickup drum for operation in a furrow.

3. The sugarcane combine specified in claim 2 in which there is a second pickup drum on top of the rotating ground knife.

4. The sugarcane combine specified in claim 1 including a transverse belt in communication with the hopper and a steep, inclined conveyor attached to the side of the frame to transport the cut cane out of the combine, the conveyor having opposed conveying means positioned to engage opposite parts of a body of cane being conveyed thereby to prevent tumble-back of the cane.

5. The sugarcane combine specified in claim 4 in which one of the opposed conveying means overlying the other to prevent tumble-back includes a hugger chain assembly formed of a T-bar having its arm end pivoted at the upper end of the conveyor and having a driven sprocket at the arm end and an idler sprocket at the other end, and a chain entrained over said sprockets to aid in moving the cane up the steeply inclined conveyor.

6. The sugarcane conveyor specified in claim 5 in which the other of the opposed conveying means has a separate endless belt extending the length thereof and being in communication with the transverse belt from the hopper.

7. Pickup and feeding means for a sugarcane harvester, which harvester includes a harvester frame provided with a ground knife for severing the cane stalks from the roots, said pickup and feeding means comprising a transversely mounted, rotating pickup drum having a plurality of radially outwardly open pockets positioned above said ground knife, the lifting action of the pickup drum picking up standing cane and down cane and transporting it to the rear of the ground knife and the pickup drum a pair of revolving endless chain conveyors, one positioned on each side of the ground knife, said conveyors extending forward from the pickup drum to pickup cane which is transverse to the movement of the harvester, and a feeder drum having helically arranged arms positioned above said pickup drum.

8. A combine for the harvesting of sugar cane, comprising: a self-propelled vehicle having a front wheel and two rear wheels; a vertically adjustable top cutter for cutting the tops from the stalks attached to the front of said vehicle: a harvesting frame pivotally attached between the wheels of said vehicle; means to raise and lower said harvester frame; a rotating ground knife for severing the stalks from the roots attached to the front of said frame; a transversely mounted rotating sickle bar cutter for cutting the severed stalks into short segments mounted in said frame rearward and upward of said ground knife; a transversely mounted rotating feed drum in the frame forward and upward of said ground knife, said feeder drum bending the cane forward prior to cutting so that, when severed, the butt ends of the cane project rearwardly; a transversely mounted rotating pickup drum having radially outwardly open pockets positioned above said ground knife and between said feeder drum and said sickle bar cutter; a transversely mounted rotating backing drum positioned beneath said sickle bar cutter, the pickup drum receiving the butt ends of the severed cane and transporting such cane to the backing drum and sickle bar cutter; a transverse endless belt rearward of said sickle bar cutter, the backing drum transporting the cane cut by the sickle bar cutter to the transverse endless belt;

a steeply inclined conveyor attached to one side of the frame and in communication with the transverse endless belt, the conveyor having an endless belt for transporting the cane upward and means to prevent tumble-back of the cane as it proceeds up the belt, the conveyor having means to deposit the transported cane to a transport wagon.

9. The combine specified in claim 8 in which the means for preventing tumble-back includes a hugger chain assembly formed of a T-bar, the arms of which are pivoted at the upper end of the conveyor; a driven sprocket journaled at the arm end of the T-bar and an idler sprocket at the other end; a chain entrained over said sprockets, said chain having fingers to aid in the movement of the cane along the endless belt, the hugger chain assembly being free to accommodate itself to the loading on the belt.

10. The combine specified in claim 8 in which the hugger chain assembly includes means to limit its movement toward the endless belt.